J. L. KUNZ.
RESILIENT WHEEL FOR VEHICLES.
APPLICATION FILED APR. 5, 1917.
1,254,705.
Patented Jan. 29, 1918.
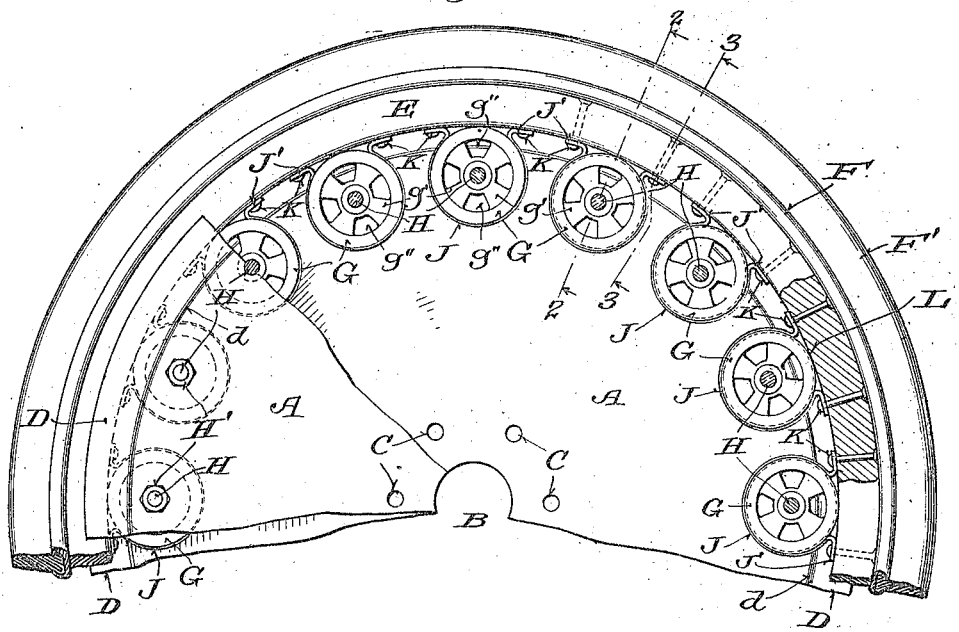
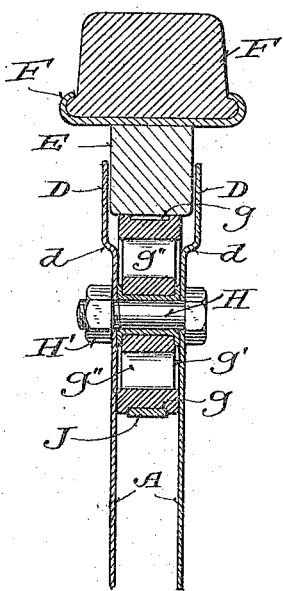
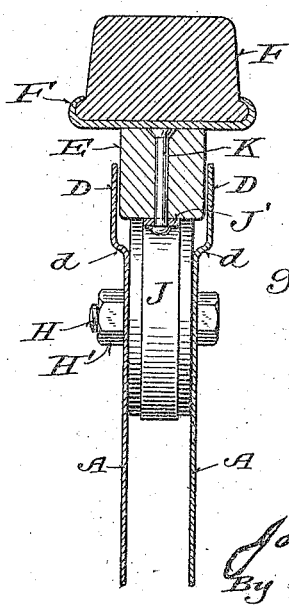
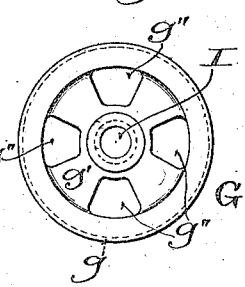
Inventor
John L. Kunz
By Erwin & Wheeler
Attorneys.

UNITED STATES PATENT OFFICE.

JOHN L. KUNZ, OF MILWAUKEE, WISCONSIN.

RESILIENT WHEEL FOR VEHICLES.

1,254,705.  Specification of Letters Patent.  Patented Jan. 29, 1918.

Application filed April 5, 1917. Serial No. 159,921.

*To all whom it may concern:*

Be it known that I, JOHN L. KUNZ, a citizen of the United States, residing at the city of Milwaukee, county of Milwaukee, and State of Wisconsin, have invented new and useful Improvements in Resilient Wheels for Vehicles, of which the following is a specification.

My invention relates to improvements in resilient wheels for vehicles, with particular reference to that type of vehicle wheel disclosed in my former applications, Serial No. 153061, filed March 7th, 1917; Serial No. 153062, filed March 7th, 1917, and application Serial No. 121,543, filed Sept. 22, 1916, allowed November 21, 1916. The object of the present invention is to provide means whereby the felly may be supported resiliently by an annular series of rubber disks, the central portions of which are supported in fixed relation to the hub or axle upon which the wheel is mounted, so far as their radial distance therefrom is concerned, said disks being associated with the felly in such a manner that each coöperates with all of the others in resiliently supporting the felly, each of the disks, however, being easily removed and replaced independently of the other disks.

In the drawings:

Figure 1 is a side elevation of a fragment of a vehicle wheel, with parts broken away to show the relation of the disks to the supporting webs, the felly and the tire.

Fig. 2 is a sectional view, drawn on line 2, 2 of Fig. 1.

Fig. 3 is a sectional view, drawn on line 3, 3 of Fig. 1.

Fig. 4 is a detail side view of one of the rubber disks.

Like parts are identified by the same reference characters throughout the several views.

My improved wheel, in common with those described in the applications above mentioned, is provided with a pair of disks, each comprising a metallic member A, having a central aperture at B to receive the hub and axle. The disks A are connected by an annular set of cross rivets or bolts, which pass through holes C adjacent to the hub. The hub and axle are not illustrated in the drawings, since these parts may be of any ordinary construction.

The outer marginal portions D of the disks A are offset outwardly to receive the felly between them. The shoulders d formed by offsetting the portions D are located at a sufficient distance inwardly from the felly E to allow freedom of radial movement to the latter, to the extent permitted by the resilient supports hereinafter described. The tire receiving rim F and tire F' may be of any ordinary construction.

A series of supporting blocks or disk shaped cushions G of resilient material such as rubber, are secured between the disks A by bolts H and clamping nuts H', the bolts passing through the central apertures I, formed in the cushions G.

Each of the cushions G is provided with a peripheral groove $g$, to receive a retaining band J, whereby the disks may be secured to the felly, the ends J' of the band being outwardly turned and connected with the felly by rivets or bolts K. The bands J preferably follow the peripheral grooves $g$ more than half way around the cushions, and are shown as fitted to about three quarters of the disk in each case, leaving a sufficient portion of the cushion exposed on the outer side for adequate bearing contact with the felly E, as illustrated at L, in Fig. 1. This bearing contact of the resilient disk G with the felly, will, of course, be normally located at a point mid-way between the outwardly turned end portions, or ears J' of the bands J, which serve as connecting brackets, adapted to secure the resilient cushions G to the felly.

To facilitate connecting the bands or brackets J with the resilient cushions G, and to also facilitate connecting these resilient members with the disks A, the hub portions and rim portions of the resilient members G are made relatively thick, to fill, or substantially fill, the space between the disks, the intermediate portions $g'$ not only being comparatively thin, but also cut away, if desired, to form openings $g''$.

The felly supporting resilient cushions G being arranged, as above stated, in an annular row within the felly, and being also uniformly spaced, it is obvious that the felly will be resiliently supported on all sides from the disks A, in such a manner that any movement of the felly relative to the disks A and in a radial direction toward the axle, will compress the outer half of each of the members G, on the side where such movement occurs. On the opposite side, the felly will tend to move away from the cushions G on that side, the latter being connected at their centers with the disks A. But, the bands J will as the wheel moves upward compress the inner half of each cushion, or member G, on the upper side of the wheel and actual contact between the members G and the felly as said bands J are tightened contributes to the durability of the wheel by avoiding the impacts which would result in case these parts were permitted to separate or move apart. I preferably apply the bands J to the cushions G in such a manner as to partially compress the latter under normal conditions, and this facilitates maintaining the contact between the members G and the felly, on the side of the wheel opposite that on which the load is being applied.

It will, of course, be understood that the felly is a substantially rigid ring, and that any movement thereof relative to the hub in any direction will be resisted by each and all of the cushions G. The retaining bands J may also be formed of resilient material, whereby they may bulge at the sides when the cushions are compressed along radial lines, and whereby they may also yield transversely to such lines, to a limited extent. The manner of connecting these bands to the felly is calculated to facilitate such yielding movements, the sides of each band approaching along the outer half of the periphery of the disk, and forming an acute angled elbow with the connecting ears or extremities J', the distance between these elbows near the respective ends of the band being considerably less than the diameter of the cushions.

While I have illustrated cylindrical or wheel shaped cushions, I do not limit the scope of my invention to cushions of any specific form or shape, although the cylindrical or wheel shaped cushions are preferred, because of facility in manufacture and in the application of the bands to the cushions, and also for the reason that the cylindrical cushions are peculiarly adapted to yieldingly resist variable pressures along radial lines, and lines transverse thereto, with substantially the same resilient effect when coupled to the felly as illustrated in the drawings.

I claim:

1. In a resilient wheel, the combination with a pair of supporting disks adapted to be connected with a hub, of a felly, an annular series of rubber cushions mounted upon said supporting disks, and arranged in an annular series within the felly, said cushions being provided with central grooves formed in their peripheries, and a series of bands for connecting said cushions with the felly, said bands being located in the grooves of the cushions, each of said cushions comprising a flat circular rubber block around which such band extends,—the ends of said band being secured to the felly.

2. In a resilient wheel, the combination with a pair of disks adapted to be secured to the hub, a felly loosely embraced between the outer margins of said disks, an annular row of circular rubber cushions interposed between said disks, connections extending through said disks and through the central portions of said cushions, and resilient bands embracing the peripheries of the cushions, except at the outer sides, and having their extremities secured to the felly.

In testimony whereof I affix my signature in the presence of two witnesses.

JOHN L. KUNZ.

Witnesses:
O. C. WEBER,
FREDERICK W. NOLTE.

Copies of this patent may be obtained for five cents each, by addressing the "Commissioner of Patents, Washington, D. C."